J. Lippincott,
Saw.
Nº 53,157.  Patented Mar. 13, 1866.
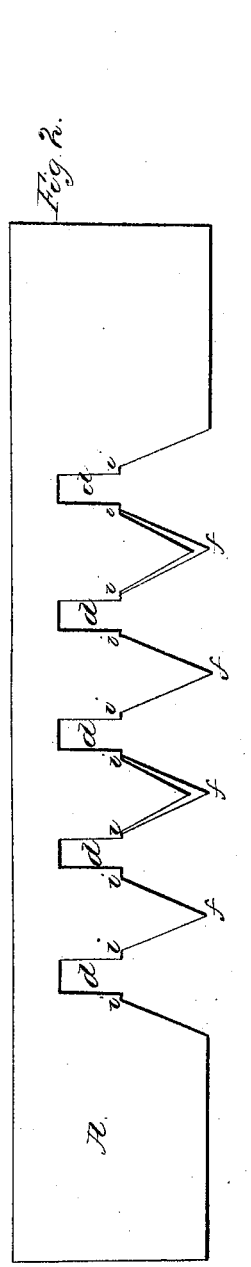
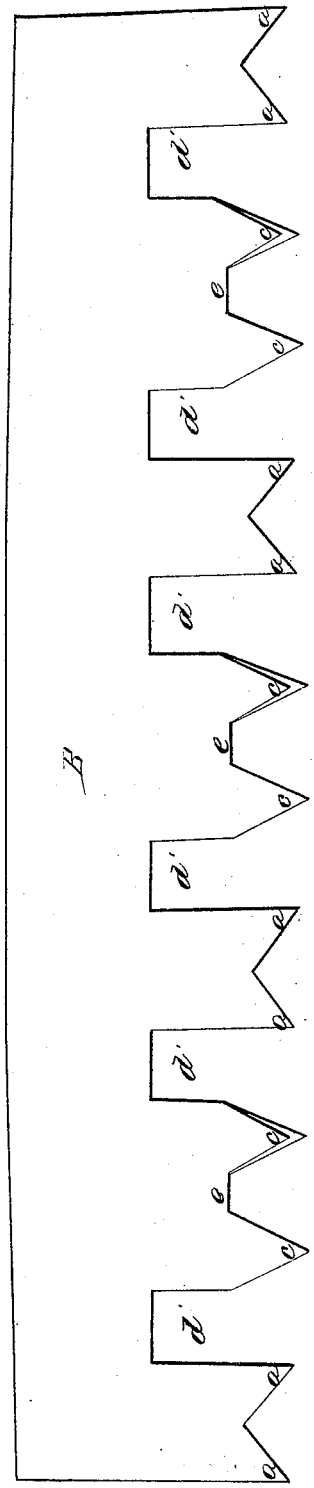
Witnesses.
W D Lewis
Allan C Bakewell
Inventor
John Lippincott
by his attorney
W Bakewell

UNITED STATES PATENT OFFICE.

JOHN LIPPINCOTT, OF PITTSBURG, PENNSYLVANIA.

IMPROVEMENT IN SAWS.

Specification forming part of Letters Patent No. 53,157, dated March 13, 1866.

*To all whom it may concern:*

Be it known that I, JOHN LIPPINCOTT, of the city of Pittsburg, in the county of Allegheny and State of Pennsylvania, have invented a new and useful Improvement in Saws; and I do hereby declare the following to be a full, clear, and exact description thereof, reference being had to the accompanying drawings, forming part of this specification, in which—

Figure 1 is a representation of a crosscut-saw constructed with my improvement. Fig. 2 shows a modification of my invention, being a saw having teeth of ordinary shape, to which it is applied.

Crosscut-saws as heretofore ordinarily made, where the outlines of the teeth are straight, are dressed by filing, and in doing this the operator usually cuts more away at the point of the teeth than at their base, because it is the points which become dull, and because, also, it is more easy to file at the point than at the base. The effect of this is that the sides of the teeth gradually come to form a less acute angle, and the distances between their points become irregular, until after awhile the saw requires to be gummed, which injures it, because the operation of gumming twists or springs the blade, which then requires to be hammered for the purpose of making it perfectly straight and true. This hammering impairs the spring-temper with which the best quality of saws are finished. This difficulty is aggravated in the case of saws having hooked or curved teeth, such as the saw known as the "Tuttle saw," which cannot be filed so as to preserve the original shape of teeth without great care and experience, so that when it gets dull it must be sent to a saw-factory to have a new set of teeth cut in it, which is a source of great trouble, expense, and delay.

The chief object of my invention is to shape the teeth of saws in such a manner as that they may be readily filed without the liability of affecting materially their angles, and without changing the proper relative distance of their points, so that the saw will not need to be gummed, but can be dressed entirely by the use of a plane-faced file.

Another object which I have in view is to shape the clearing teeth or planers, when used with fleam or lance teeth, in such a manner as that they will not be apt to take too deeply into the wood or to ride on the surface without clearing out the kerf.

To enable others skilled in the art to construct and use my improvement, I will proceed to describe it more fully.

In the drawings, Fig. 1 represents a crosscut-saw having alternate sets of cutters or fleam-teeth $c$ $c$, and of clearers or planing-teeth $a$ $a$. The shape of the fleam-teeth is that of an isosceles triangle, which is the ordinary shape, the two teeth in each set or pair being so dressed that their cutting-edges shall be on opposite sides of the kerf, and the points of these fleam-teeth $c$ $c$ are a little longer than those of the clearing-teeth $a$ $a$. Between each tooth in a set or pair of fleams is a short space, $e$, the line of which is parallel with the back of the saw, separating the base of the teeth at their opposite sides, which allows a file to be easily inserted to the very bottom of the teeth, and thus prevents the liability to file more at the point than at the base of the tooth, which is very apt to be done if the opposite faces of two teeth meet in an angle at their base. The cutter-teeth $a$ $a$ are also set in pairs between the pairs of fleam-teeth $c$ $c$, as shown in Fig. 1. These teeth are M-shaped, or rather a pair of teeth presents that shape, the object of which is that each cutter-tooth, as it passes through the kerf to clear out the wood from the score cut by the fleam-teeth, shall present a perpendicular face to the cutting-line of the saw. Teeth thus constructed more readily clear out the kerf, and are not apt either to take too deep a hold or to ride on the surface of the wood without clearing out the kerf. This shape of teeth also serves to preserve a more uniform distance between the points of all the teeth—both fleams and clearers—along the edge of the saw, whereas in my saws a space between each pair of teeth is occupied by a slot extending below the base of the teeth, which would otherwise cause the point of each fleam-tooth to be much farther from the point of its adjoining cutter-tooth than the cutters or fleams are from each other.

Between each pair of clearers $a$ $a$ and fleams $c$ $c$, I cut a slot, $d'$, in the saw-blade, extending with parallel sides below the roots of the teeth toward the back of the saw to such depth and width, either greater or less than is shown in the drawings, as may suit the fancy of the manufacturer. In Fig. 1 this slot is a continuation in a right line of the outer sides of the M-shaped clearing-teeth. The object of this slot is to enable any one who desires to dress or sharpen the saw to preserve the shape, distance apart, and angles of the teeth of the saw, by laying the file, when using it, flat on the edge of the tooth, bearing equally on both sides of the file. It will be very difficult for any one having the least practical experience in filing saws to go wrong or to alter materially the shape or relative position of the teeth. These slots $d'$ may be deepened, if required, in the same way as the teeth are filed, and serve as infallible guides for dressing the saw. A saw thus constructed needs never to be gummed, as it may be dressed with a plane-faced file until it is entirely worn out, and is as efficient as any crosscut-saw heretofore made with which I am acquainted. The great ease with which it can be kept in order by any good mechanic with an ordinary file will prove an incalculable advantage.

Fig. 2 represents the application of the parallel slot to a saw having the old style of teeth. The teeth $f f f$ are isosceles-shaped, and incline equally on both sides to the point. At the base of each is a short shoulder, $i$, parallel to the back of the saw, and between each tooth is a slot, $d$, in the saw. (Represented in Fig. 1.) The shoulder $i$ is not necessary, but adds somewhat to the strength of the blade. The object of the slot $d$ is the same as in the saw previously described, serving as a guide in filing the teeth, and enabling the saw to be dressed without gumming.

I do not confine myself in the use of the slot between the teeth to its combination with the M-shaped teeth which I have described, nor to saw-teeth of any specific shape, as it may be obviously applied with advantage to saw-teeth of a variety of shapes, and with circular saws as well as with long saws.

Having thus described my improvement in saws, I do not claim, broadly, the making of indentations in saw-blades extending below the point where the cutting-edge of the fleam-teeth terminates; but

What I claim as my invention, and desire to secure by Letters Patent, is—

The use, in crosscut-saws, of a slot or indentation having parallel sides, and extending into the blade below the root or termination of the inclined side of the teeth for the purpose of serving as a guide in dressing the saw with a file so as to preserve the original shape and relative distance apart of the saw-teeth and enable it to be kept in order without gumming.

In testimony whereof I, the said JOHN LIPPINCOTT, have hereunto set my hand.

JOHN LIPPINCOTT.

Witnesses:
ALLAN C. BAKEWELL,
A. S. NICHOLSON.